United States Patent [19]

Abe et al.

[11] 4,345,975
[45] Aug. 24, 1982

[54] PROCESS FOR PREVENTING BLOCKAGE IN DISTILLATION COLUMN OF TREATMENT APPARATUS FOR AMMONIACAL WASTE LIQUID

[75] Inventors: Hideshi Abe, Kurashiki; Koji Tonooka, Okayama, both of Japan

[73] Assignee: Mitsui Kensetsu Kabushiki Kaisha, Tokyo, Japan

[21] Appl. No.: 213,625

[22] Filed: Dec. 5, 1980

Related U.S. Application Data

[62] Division of Ser. No. 31,036, Apr. 18, 1979, abandoned.

[30] Foreign Application Priority Data

Sep. 12, 1978 [JP] Japan .................................. 53-111313
Jan. 30, 1979 [JP] Japan .................................... 54-8791

[51] Int. Cl.³ .............................................. B01D 3/34
[52] U.S. Cl. ............................ 203/37; 159/DIG. 13; 210/737
[58] Field of Search .................. 210/56; 159/DIG. 13; 423/357, 356; 203/7, 36, 37, 47, 48, 33; 202/160, 176, 177, 179, DIG. 1

[56] References Cited

U.S. PATENT DOCUMENTS 3,278,423 10/1966 Millar .................................. 423/357

OTHER PUBLICATIONS

"An Improved Process for the Removal of Ammonia from Coke Plant Weak Ammonia Liquor"; I. & S.M.; Rudzki et al.; Jun. 77.

Primary Examiner—Frank Sever
Attorney, Agent, or Firm—Armstrong, Nikaido, Marmelstein & Kubovcik

[57] ABSTRACT

In an apparatus for treatment of an ammoniacal waste liquid comprising a reaction tank for effecting a decomposition reaction of fixed ammonia by adding a calcium series alkali so as to obtain a reaction product comprising free ammonia and a calcium salt, a solid-liquid separator for effecting separation of the calcium salt so as to obtain a separated liquid, a distillation column for steam-stripping of the free ammonia from the separated liquid, and a pipe passage connecting consecutively said reaction tank, said separator and said distillation column, the improvement comprising a heat aging tank interposed in the pipe passage between the solid-liquid separator and the distillation column so that the calcium salt present in a dissolved state in the separated liquid may be separated out and aged in the aging tank where the liquid is raised to the temperature at the top of the distillation column, thus preventing blocking in the distillation column.

The distillation column may also be provided with a circulating pipe passage for an acid washing liquid, in a communication at both ends with the column and also provided with a nozzle for blowing gas for stirring the washing liquid in the column.

3 Claims, 4 Drawing Figures

PROCESS FOR PREVENTING BLOCKAGE IN DISTILLATION COLUMN OF TREATMENT APPARATUS FOR AMMONIACAL WASTE LIQUID

This is a division of application Ser. No. 31,036, filed Apr. 18, 1979, now abandoned.

SUMMARY OF THE INVENTION

This invention relates to an apparatus for preventing blockage in a distillation column of a treatment apparatus for an ammoniacal waste liquid such as gas liquor from a coke oven or the like.

For removing ammonia from a waste liquid containing ammonium sulfate or the like, it has usually been the practice hitherto to treat the waste liquid with slaked lime to obtain a pH of 11–12 and to decompose the fixed ammonia such as ammonium sulfate or the like into free ammonia, while the acid constituent thereof is combined with the calcium constituent of the slaked lime so as to produce gypsum or the like, and thereafter the resultant suspension including the gypsum or the like and the excess slaked lime is introduced into a separator which operates by sedimentation such as a thickener or the like, and the supernatant, that is, the separated liquid obtained by sedimentation is introduced into a distillation column, and thereby the free ammonia in the separated liquid is removed therefrom by steam-stripping. In this process, however, the separated liquid contains a calcium salt such as gypsum partly dissolved therein depending on its temperature, and the calcium salt is such that the solubility thereof is lowered according as the liquid temperature is raised, so that when the steam-stripping is carried out in the distillation column, the liquid temperature becomes significantly high, and as a result the dissolved calcium salt is separated out inside the column and the resultant calcium salt adheres to the trays and its crystals block up the perforations of the trays, resulting in operational difficulties.

For preventing the trays from being blocked up, the construction of the tray in the distillation column has been so improved that a stationary perforated plate type or bubble cap type which has been used in most cases is changed to a movable type which is always moving during operation so as to decrease the adherence of the crystals. Alternatively the size of the perforations of the trays is increased so that passing of the liquid therethrough can be permitted still longer even after the crystals are adhered, and consequently the operation time can be extended even a little longer until the perforations are blocked up in due course. However, these improved means hardly can prevent adhering of the salt to the trays, so that a continuous operation which can be carried out is only for about 3 months at the longest, and there is still the disadvantage that the work for removing the blocking substances from the trays must be carried out frequently.

This invention has as its object to provide an apparatus which is free from those disadvantages and makes it possible to carry out a long-term continuous operation for treating an ammoniacal waste liquid. According to this invention, in such a type of treatment apparatus where there are interposed, in a pipe passage for treating an ammoniacal waste liquid, a reaction tank for effecting a decomposition reaction of fixed ammonia by adding a calcium series alkali so as to obtain a reaction product comprising free ammonia and a calcium salt, a solid-liquid separator for effecting separation of the calcium salt so as to obtain a separated liquid, and a distillation column for steam-stripping of the free ammonia from the separated liquid, there is provided a heat aging tank interposed between the solid-liquid separator and the distillation column so that the calcium salt present in a dissolved state in the separated liquid may be separated out and aged in the aging tank.

A second feature of this invention has for its object to provide an arrangement in the foregoing apparatus whereby the interior of the distillation column may be washed in situ. According to the second feature of the invention, the distillation column is provided with a circulating pipe passage for an acid washing liquid such as dilute hydrochloric acid or the like that is, at its both ends, in communication therewith, and is also provided with a nozzle for blowing gas for stirring the washing liquid in the column.

DETAILED DESCRIPTION

The inventors have conducted various investigations and experiments on the adherence of the calcium salt crystals to the trays in the distillation column. As a result thereof, it has been confirmed that the amount of the dissolved calcium salt present in the supernatant, that is, in the separated liquid in the thickener, which precipitates out is increased in proportion to the temperature rise, but all of the precipitated calcium salt does not adhere to the trays, and at the initial separation stage, the nuclei of the precipitates are adhered to the tray surfaces, especially, at the tray surface areas disposed nearer the vent opening of the column, and the same are grown into crystals. In the meanwhile, the crystals dispersed and grown in the liquid are hard to adhere to the trays. In fact, the adhering phenomenon to the trays in the distillation column is often generated in most cases at the upper portion of the column, that is, the supply side thereof.

Figure 1:
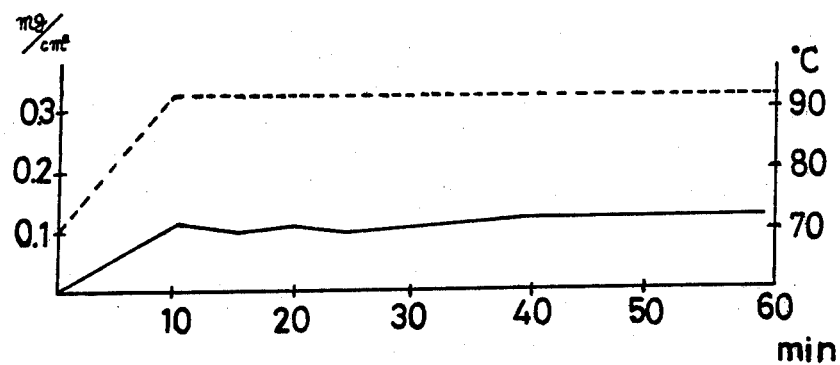
FIG. 1 is a diagram showing the results of a still deposition test of separated liquid after the decomposition reaction of the waste liquid with slaked lime.

A beaker experiment has been conducted on the crystal adhering velocity at the initial separation-out stage, to obtain a diagram as shown in FIG. 1 by using such a separated liquid sample prepared by treating the waste liquid with slaked lime so as to obtain a pH of 11 and thereafter removing solid substances by sedimentation from the reaction product. Namely, as shown by the solid line in the same Figure the crystal adhesion rate is increased rapidly in the initial period and thereafter the adhesion rate is extremely slow, and it has been observed that there is an increase in the amount of crystals which are not adhered thereto but remain dispersed and grown in the liquid. The adhesion amount is represented by adhesion force per unit area (mg/cm$^2$) to a test piece (a steel plate 9 cm$^2$) with the lapse of time. The dotted line in FIg. 1 represents the temperature.

Figure 2:
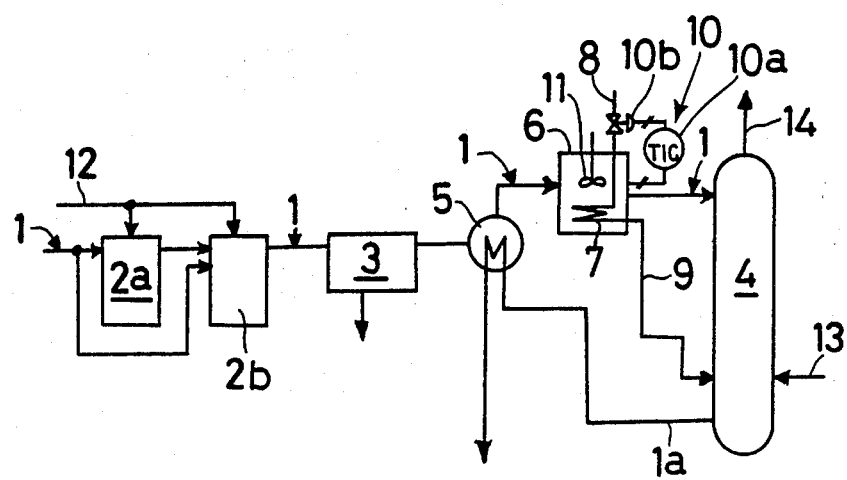
FIG. 2 is a flow sheet showing one example of the apparatus of this invention.

One embodying example of the apparatus of this invention which makes it possible to carry out a long-term and stable continuous operation, on the basis of the above observations and experiments, will be explained with reference to FIG. 2.

Numeral 1 denotes a waste liquid pipe passage leading from a coke oven, and numerals 2a, 2b, 3 and 4 denote a first reaction tank, a second reaction tank, a thickener serving as a solid-liquid separator and a distillation column which are interposed in order in the waste liquid pipe passage 1. The pipe passage 1 between the thickener 3 and the distillation column 4 is provided with a heat exchanger 5 and a heat aging tank 6 interposed therein in order. The heat exchanger 5 is arranged so that a deammoniated liquid pipe passage 1a leading from the bottom portion of the distillation column 4 is introduced into the heat exchanger 5 so that the waste liquid may be heat-exchanged with the deammoniated liquid. The heat aging tank 6 has a sufficient volume so that the supernatant liquid which flows into it may be retained therein for about 5 minutes or more (preferably 10-30 minutes), and a heating pipe 7 is provided therein and is so arranged that part of the steam serving as a heat source for the distillation column 4 may be led therein through a pipe 8 and thereafter may reach the distillation column 4 through a pipe 9. The heat aging tank 6 is provided with an automatic temperature control means 10 comprising a temperature indication and control meter 10a and a flow rate control valve 10b interposed in the pipe 8 so that the temperature in the heat aging tank 6 may be detected by the meter 10a, and the control valve 10b may be controlled by an output signal thereof for controlling the amount of steam, and thereby the liquid temperature may be maintained the same as the column top temperature of the distillation column 4. Numeral 11 denotes an agitator provided in the heat aging tank 6, numeral 12 denotes a pipe for supplying milk of lime into the reaction tanks 2a, 2b, numeral 13 denotes a steam pipe for supplying the steam to the distillation column 4, and numeral 14 denotes an ammonia gas pipe for discharging separated ammonia vapor from the top of the column 4.

Thus, the waste liquid from the coke oven is reacted with the slaked lime added in the first reaction tank 2a and the second reaction tank 2b, respectively, whereby the fixed ammonia such as ammonium sulfate or the like is decomposed into free ammonia such as ammonium hydroxide or the like and a calcium salt such as calcium sulfate, that is, gypsum or the like. Thereafter, at the thickener 3, the suspension containing the reaction product comprising the free ammonia and the gypsum or the like and the excess slaked lime is subjected to separation by sedimentation, whereby there is obtained the supernatant, that is, the separated liquid containing the free ammonia. This separated liquid is previously heated by the heat exchanger 5 and is then sent to the heat aging tank 6. In the heat aging tank 6, the separated liquid is heated and adjusted in temperature by the automatic temperature control means 10 so as to maintain substantially the same temperature as the column top temperature (usually 90-100° C.) of the distillation column 4, and is retained in the tank 6 for 5 minutes or above, so that the dissolved calcium salt present in the separated liquid is separated out and is aged, and thus the crystals are grown.

Thereafter, the separated liquid containing the calcium salt crystals thus aged and the free ammonia is introduced into the top portion of the distillation column 4, and the free ammonia is separated and removed by the steam-stripping. Since the calcium salt crystals have already been aged in the aging tank 6, they do not adhere to the trays in the distillation column 4. Accordingly, blocking up in the distillation column is very difficult to occur and a long-term continuous operation thereof can be effected.

The specification and conditions of the experimental apparatus are shown as follows:

Supply amount of the waste liquid: 30 m$^3$/H
Calcium component dissolved in the supernatant liquid: 30° C. saturated
pH in the reaction tanks
   11 in the first
   11.5 in the second
Temperature at the top portion of the distillation column: 95° C.
Inner volume of the heat aging tank 7.7 m$^3$
The distillation column 0.9 m $\phi \times$ 15 m h
Movable perforated plate type 15 stages With the lapse of eight months since starting under the above conditions with the heating temperature in the heat aging tank 6 being 95° C. and the retention time therein being 15 minutes, there has not occurred any blocking trouble in the distillation column 4 and such a long-term continuous operation has been carried out.

Even though the long-term continuous operation over eight months or more has become possible as above, there is still a fear that the calcium salt will gradually adhere to the trays and finally block up the same where the operation is further continued thereafter. If, accordingly, the work for removal of the adhered salt is carried out in such a manner that the operation is stopped at the rate of one time per about 8-10 months and the trays are disassembled, it takes about one week in the case of the distillation column with 15 stages, for instance, and also requires much labor and cost.

The inventors have made an analysis of the substance adhering to the trays with the following result:
Ca—30.80%, SO$_4^{-2}$—0.26%
Fe—0.93%, NH$_4^+$—0.23%

It has been confirmed by the inventors that the adhered substance can be easily removed from the trays by a process in which the substance is nearly completely dissolved in a short time by dilute hydrochloric acid of 2 to 5%, and a small amount of the remainder not dissolved thereby is washed away by a flow of water.

Figure 3:
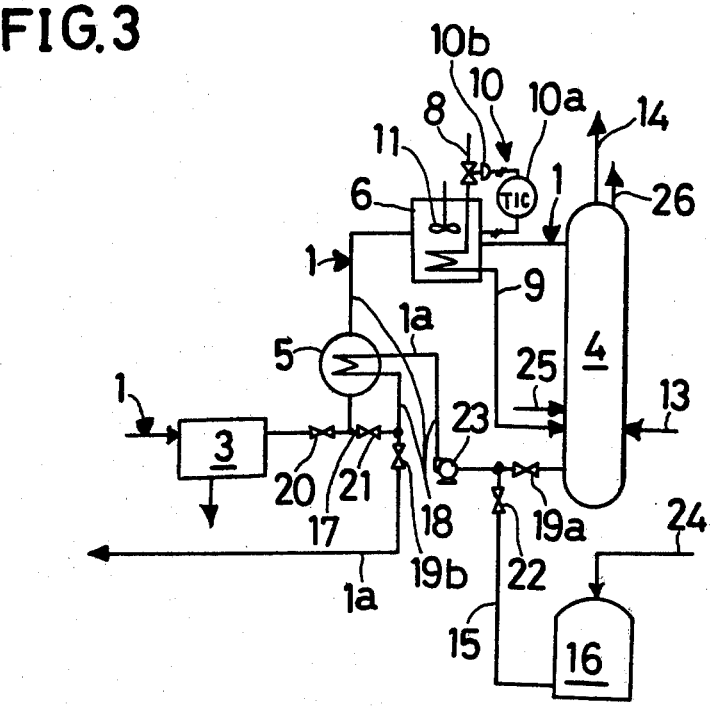
FIG. 3 is a flow sheet showing one example of an apparatus according to the second feature of this invention.

The second feature of this invention is based on this confirmation, and a concrete example thereof will be explained with reference to FIG. 3.

Namely, the embodying apparatus of this invention as mentioned before is provided with a diverged pipe passage 15 diverged from the deammoniated liquid pipe 1a let out from the bottom portion of the distillation column 4, and a washing liquid tank 16 connected to the front end thereof, and a by-pass pipe passage 17 is provided to connect between the deammoniated liquid pipe passage 1a and the pipe passage 1 extending from the thickener 3. Consequently, 1a circulation pipe passage 18 for circulating a washing liquid is formed by the deammoniated liquid pipe passage 1a, the by-pass passage 17 and the pipe passage 1 extending from the thickener 3 to the top portion of the column 4. Numerals 19a, 19b denote valves interposed in the deammoniated liquid pipe passage 1a, numerals 20, 21, 22 denote valves interposed in the pipe passage 1 from the thickener 3, the by-pass passage 17 and the diverged pipe passage 15, respectively, numeral 23 denotes a pump, numeral 24 denotes a pipe for charging, for instance, hydrochloric acid, diluting water and inhibitor, numeral 25 denotes a gas blowing nozzle for forcing nitrogen gas, for instance, for stirring the washing liquid in the distillation column 4, and numeral 26 denotes an exhaust pipe for the gas.

Thus, the tank 16 is previously filled with dilute hydrochloric acid of 2-5% concentration mixed with a corrosion inhibitor, such as an organic compound of amine type or the like. In the meanwhile, the charging of the waste liquid into the distillation column 4 and the blowing of the steam therethrough are stopped, and thereafter the liquid in the distillation column 4 is removed by the pump 23 for emptying the column 4.

Next, the valves 22, 21 are opened and the valves 19a, 19b 20 are closed, and the distillation column 4 is charged and filled with the washing liquid, by driving the pump 23, through the diverged pipe 15, the deammoniated liquid pipe passage 1a, the by-pass pipe passage 17 and the waste liquid pipe passage 1. In this case, the same is filled therewith to such an extent that the uppermost stage tray is immersed therein. The valve 19a is then opened and the valve 22 is closed, and the washing liquid is circulated, by driving the pump 23, through the distillation column 4 and the circulation passage 18, and additionally the washing liquid in the column 4 is stirred by blowing in nitrogen gas from the nozzle 25. Thus, the trays are washed by the acid, and after the completion thereof the valve 19b is opened and the valve 21 is closed, and the washing liquid is discharged through the deammoniated liquid pipe 1a by driving the pump 23. Thereafter, the tank 16 is filled with water and is rinsed therewith in almost the same washing operation as above. In this case, the blowing with nitrogen gas is also carried out. Finally, the water is removed, and then the column 4 is filled with the waste liquid ready for resuming the operation.

One specific embodying example thereof is shown as follows:

Size of the distillation column: 0.9 m in diameter 15 m in height
Pump capacity: 48 m³/H
Washing liquid tank volume: 10 m³

Figure 4:
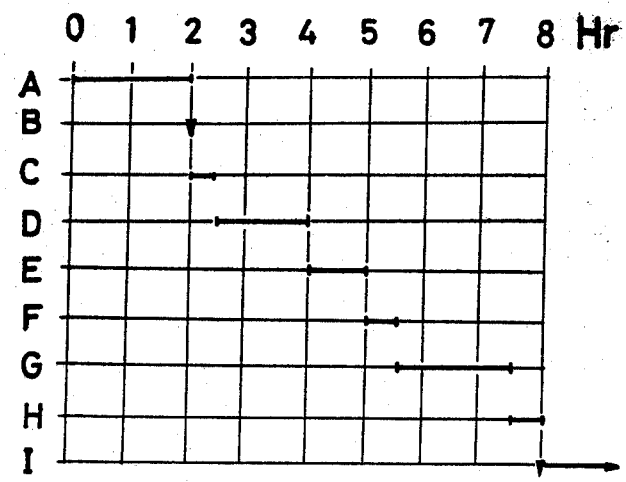
FIG. 4 is a process diagram of one specific example thereof.

The washing process is carried out and completed, with the above arrangement according to a time schedule as shown in FIG. 4. Namely, the total necessary time is 8 hours. In the same Figure, A is a stage for preparation for washing, B is that for stop of the operation, C is for discharging of the waste liquid, D is for filling of the washing liquid in the distillation column, E is for circulation of the washing liquid, F is for discharging of the washing liquid, G is for washing with water, H is for charging of the waste liquid in the distillation column and I is for resuming of the operation.

Thus according to this invention, the pipe passage between the solid-liquid separator and the distillation column is provided with the heat aging tank and it is so arranged that the calcium salt present in a dissolved state in the liquid separated by the solid-liquid separator is separated out and aged in the heat aging tank, before the separated liquid is charged into the distillation column, so that the adhesion of the calcium salt to the trays in the column hardly occurs and consequently a long-term continuous operation can be carried out. According to the second feature of this invention, it is so arranged that washing of the trays may be carried out in such a manner that the washing liquid is circulated through the distillation column while being stirred, so that even when there are crystals adhered to the trays, the same can be removed in a short time, in situ, without disassembling the column, and thus the cost is lowered.

We claim:

1. In a method for treatment of an ammoniacal waste liquid comprising the steps of effecting a decomposition reaction of fixed ammonia by adding a calcium series alkali so as to obtain a reaction product comprising free ammonia and a calcium salt, separating the calcium salt so as to obtain a separated liquid, and steam-stripping the free ammonia from the separated liquid in a distillation column, the improvement comprising the step of aging the separated liquid in an aging tank for at least 5 minutes at an elevated temperature equal to the temperature at the top of the distillation column immediately prior to the steam-stripping, thus preventing blocking in the distillation column.

2. The improvement according to claim 1, further comprising the steps of periodically discontinuing the treatment method steps, draining the column and the aging tank, filling the aging tank and the column with an acid washing liquid, washing the distillation column with acid washing liquid by circulating the liquid, draining the liquid from the column and tank, rinsing the column and tank, charging fresh separated liquid, and resuming the treatment method steps.

3. The improvement of claim 1, further comprising exchanging heat between stripped separated liquid and separated liquid before aging after the conversion step.

* * * * *

UNITED STATES PATENT AND TRADEMARK OFFICE
CERTIFICATE OF CORRECTION

PATENT NO. : 4,345,975

: Issued: August 24, 1982

INVENTOR(S) : HIDESHI ABE et al

It is certified that error appears in the above-identified patent and that said Letters Patent are hereby corrected as shown below:

On the title page assignee should read

-- [73] Assignee: Mitsui Kensetsu Kabushiki Kaisha and
Kawatetsu Kagaku Kabushiki Kaisha,
Tokyo, Japan --

Signed and Sealed this

Tenth Day of May 1983

[SEAL]

*Attest:*

GERALD J. MOSSINGHOFF

*Attesting Officer*     *Commissioner of Patents and Trademarks*